US012783680B2

(12) United States Patent
Gopalakrishna et al.

(10) Patent No.: US 12,783,680 B2
(45) Date of Patent: Nov. 3, 2026

(54) DYNAMIC SECURITY MONITOR FOR A BACKUP STORAGE SYSTEM

(71) Applicant: Dell Products L.P., Round Rock, TX (US)

(72) Inventors: Madhu Agrahara Gopalakrishna, Pleasanton, CA (US); Mahadev Karadigudda, San Jose, CA (US); Niharika Avasarala, Pleasanton, CA (US); Sankalp Suhas Taralekar, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 191 days.

(21) Appl. No.: 18/410,286

(22) Filed: Jan. 11, 2024

(65) Prior Publication Data

US 2025/0232036 A1 Jul. 17, 2025

(51) Int. Cl.
*G06F 21/57* (2013.01)

(52) U.S. Cl.
CPC .................................. *G06F 21/577* (2013.01)

(58) Field of Classification Search
None
See application file for complete search history.

(56) References Cited

U.S. PATENT DOCUMENTS

| | | | |
|---|---|---|---|
| 10,810,089 B1 | 10/2020 | Gu et al. | |
| 12,483,574 B1 | 11/2025 | Saperstein et al. | |
| 2009/0024663 A1* | 1/2009 | McGovern | G06F 21/577 |
| 2019/0138727 A1* | 5/2019 | Dontov | G06F 11/1464 |
| 2020/0159624 A1 | 5/2020 | Malkov et al. | |
| 2020/0167470 A1* | 5/2020 | Kochura | G06N 5/01 |
| 2020/0285546 A1 | 9/2020 | Kraplanee et al. | |
| 2020/0314134 A1* | 10/2020 | Izrael | G06F 21/554 |
| 2021/0166548 A1 | 6/2021 | Ellam et al. | |
| 2022/0156384 A1 | 5/2022 | Mandagere et al. | |
| 2024/0007496 A1 | 1/2024 | Yampolskiy et al. | |
| 2025/0103438 A1 | 3/2025 | Gildein et al. | |

* cited by examiner

*Primary Examiner* — Fatoumata Traore
(74) *Attorney, Agent, or Firm* — Dergosits & Noah LLP; Todd A. Noah

(57) ABSTRACT

A dynamic security monitor for a backup storage system is provided. A system determines risk factors, based on security parameters received from a backup storage system. The risk factors are associated with data at rest, access control, digital certificates, and encryption keys. The system determines factor scores, corresponding to the risk factors, based on values of the security parameters, wherein each factor score is inversely related to a corresponding level of security risk. The system outputs a security health score based on a product of each of the factor scores. If the security health score is less than a threshold, the system outputs an alert which enables a system user to identify and resolve a security risk, then outputs an updated security health score based on any change in any value of any parameter used to determine any of the factor scores.

20 Claims, 5 Drawing Sheets

DYNAMIC SECURITY MONITOR FOR A BACKUP STORAGE SYSTEM

BACKGROUND

Security misconfiguration is one of the most significant contributors for data storage systems being vulnerable and can lead to catastrophic data loss. To avoid security breaches, it is important to analyze all potential security gaps and take corrective actions as necessary. Multiple cases have demonstrated that practices such as continuing to use default passwords and the failure to enable additional security safeguards resulted in serious consequences for the security of data storage systems. Multiple factors can contribute to the overall security of a backup storage system.

DETAILED DESCRIPTION

Figure 1:
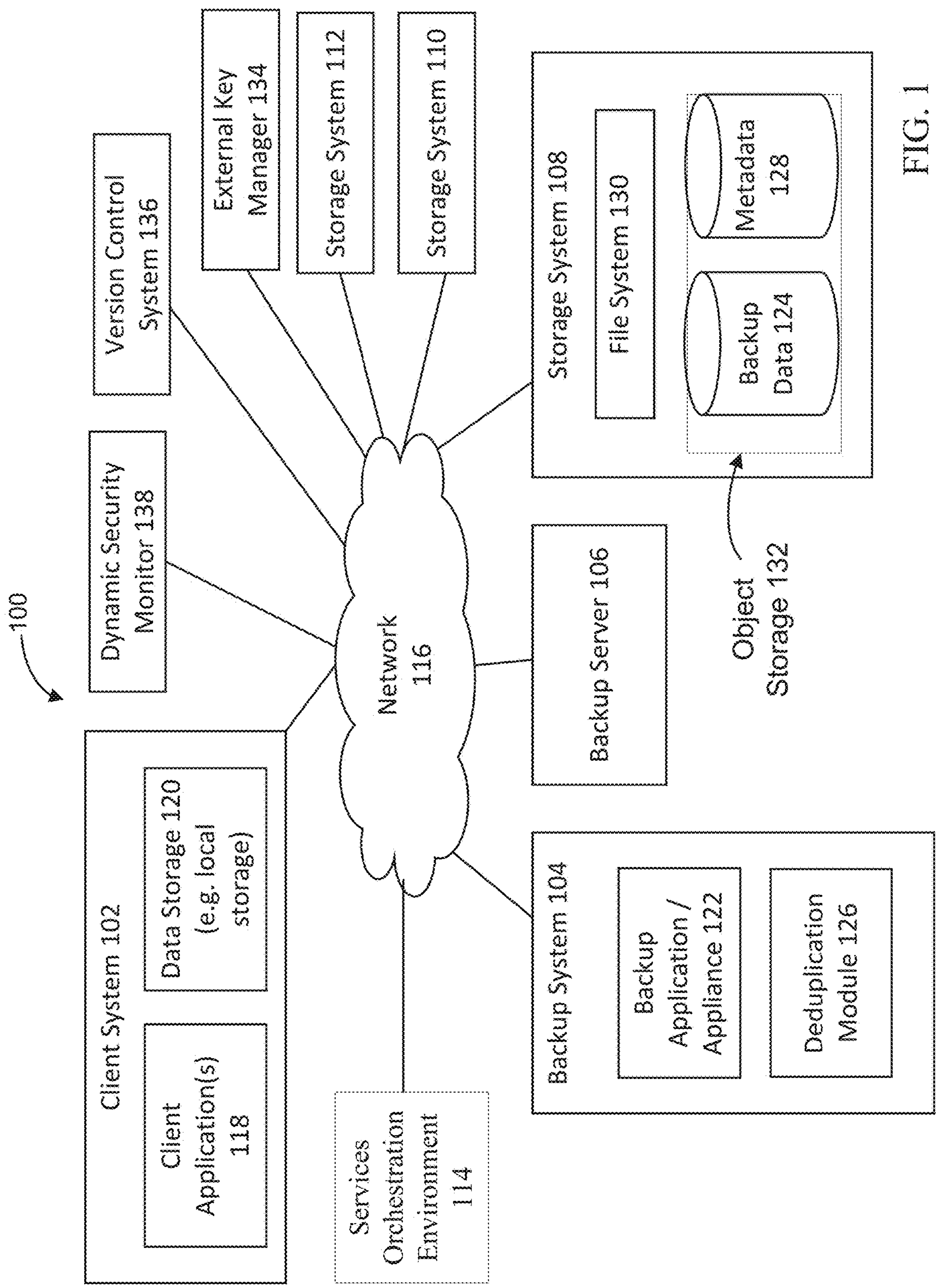
FIG. 1 illustrates a block diagram of an example system for a dynamic security monitor for a backup storage system, under an embodiment.

Embodiments of the present disclosure provide a dynamic security monitor for a backup storage system. A system determines risk factors, which are based on security parameters received from a backup storage system, wherein the risk factors are associated with data at rest, access control, digital certificates, and encryption keys. The system determines factor scores, corresponding to the risk factors, which are based on values of the security parameters received from the backup storage system, wherein each factor score is inversely related to a corresponding level of security risk. The system outputs a security health score based on a product of each of the factor scores. If the security health score is less than a threshold, the system outputs an alert which enables a system user to identify and resolve a security risk. The system outputs an updated security health score based on any change in any value of any parameter used to determine any of the factor scores.

For example, upon receiving and analyzing the auto-support security parameters that a system user opted to provide from the backup storage system used by the system user, a dynamic security monitor identifies risk factors which include a data at rest encryption status, a security officer configuration, a digital certificate revocation status, an encryption key rotation frequency, a connectivity with an external key manager, an alert mechanism status, and a passphrase level. The dynamic security monitor analyzes the values of the system parameters, and then assigns the high factor score of 10 to each of the risk factors which indicate that data at rest is encrypted, a security officer is configured with an appropriate level of privileges, no digital certificates are revoked, encryption keys are rotated weekly, a good connectivity with an external key manager, and a system for alerting users is enabled. However, the dynamic security monitor assigns a medium-to-high factor score of 7.5 to the risk factor for passphrases because the system user is not using sufficiently strong passphrases. Therefore, the dynamic security monitor combines all of the factors scores to generate a security health score of 75, which is less than the desired minimum security health score of 80, so the dynamic security monitor alerts the system user of the need to strengthen the passphrases. In response to the system user changing the strength of the passphrases, the dynamic security monitor dynamically updates the security health score to 100, and continues monitoring all of the values of the system parameters received in the auto-support information provided by the backup storage system used by the system user.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "an embodiment" or "the embodiment" in various places in the specification do not necessarily all refer to the same embodiment.

Exemplary Environments

More specifically, and with reference to FIG. 1, shown is a block diagram illustrating an example of an operating environment 100 for a dynamic security monitor for a backup storage system according to one or more embodiments of the disclosure. As shown, the operating environment 100 may include a client system 102, a backup system 104, a backup server 106, a cluster of storage systems 108-112, and a services orchestration environment 114, which may interact via a network 116, which may be any type of wired or wireless network including a local area network (LAN), a wide area network (WAN), or a direct communication link, or other suitable connection. Collectively, the backup system 104, the backup server 106, the cluster of storage systems 108-112, may be referred to as components of a backup storage system, such that the term "backup storage system" may refer to any combination of the components 104-112.

As shown, the operating environment 100 may include a client or client system (or computer, or device) 102 that may be associated with a system user of a data backup and protection service, and the backup system 104 that may be associated with a data backup and protection service provider. For example, the client system 102 may provide computing resources (such as databases) for customers (such as website visitors) of a system user, and data which may be protected by the backup and data protection service provider. Accordingly, the client system 102 may function as a client from which backups are performed. In some embodiments, the client system 102 may comprise a virtual machine.

In addition, the client system 102 may host one or more client applications 118, and may include data storage 120, as well as an interface for communicating with other systems and devices, such as the backup system 104. In general, the client applications 118 may create new and/or modified data that is desired to be protected. As such, the client system 102 is an example of a host device. The data storage 120 may be used to store client data, which may, along with the client system 102 (such as the client applications 118), be backed up using the backup system 104.

As further described herein, components of the client system 102 (such as the client applications 118 and the data storage 120) may be a data source, or be associated with one or more data sources such as a database, a virtual machine, and a storage device. In addition, components of the client system 102 may be data sources that are associated with the client system 102, but these components may reside on separate servers, such as a data server, or a cloud-computing infrastructure. The client system 102 may include a backup client application, or plug-in application, or Application Programming Interface (API) that cooperates with the backup system 104 to create backups of client data. The backed-up data can also be restored to the client system 102.

In at least one embodiment, the backup system 104 may represent one or more components of a Data Domain Restorer-based deduplication storage system, and a backup server 106 may be implemented in conjunction with a Data Domain deduplication storage server provided by Dell EMC for use with Data Domain Restorer storage devices. For example, the backup server 106 may be a stand-alone entity, or may be an element of the cluster of storage systems 108-112. In some embodiments, the backup server 106 may be a Dell EMC Avamar server or a Dell EMC Networker server, although no particular server is required, and other backup and storage system configurations are contemplated.

The backup system 104 may include a backup application (or appliance) 122 that performs, manages, or coordinates the creation and restoration of data that may be backed-up. For example, data to be backed-up from the client system 102 may be communicated from the client system 102 to the backup application 122 for initial processing, after which the processed data, such as backup data 124, is uploaded from the backup application 122 for storage at the cluster of storage systems 108-112. In some embodiments, the backup application 122 may cooperate with a backup client application of the client system 102 to back up client data to the cluster of storage systems 108-112. The backup application 122 may also cooperate with a backup client application to restore backup data from the cluster of storage systems 108-112 to the client system 102.

In some embodiments, the backup application 122 may be a part of, or work in conjunction with, a storage appliance. For example, the storage appliance may include a Dell EMC Cloud Boost appliance, or any suitable appliance. In addition, the backup application 122 may provide a variety of useful functionalities such as source-side data deduplication, data compression, and wide area network (WAN) optimization boost performance and throughput, while also possibly reducing the consumption and cost of network bandwidth and cloud storage capacity.

One, some, or all, of these functions of the backup application 122 may be performed using deduplication logic via a deduplication module 126. For example, the deduplication module 126 can provide data segmentation, as well as in-flight encryption as the data is sent by the backup application 122 to the cluster of storage systems 108-112. However, as further described herein, in some embodiments, data deduplication may be performed entirely within the cluster of storage systems 108-112. It should be noted that the backup application (or storage appliance) 122 may be implemented in various forms, such as a virtual, physical, or native public cloud appliance to fit the requirements of a particular configuration, and the backup application 122 may be used with distinct types of data protection environments, including public and private object storage clouds.

The storage system 108, which is substantially similar to the storage systems 110-112, may store backup data 124 (backup files or backup objects) within a one or more computer nodes, as further described herein. As shown, the storage system 108 may also store metadata 128 for (or associated with) the backup data 124, and one or more instances of a filesystem 130 that catalogs backup files and other data residing in the clustered environment. In general, the storage of the backup data 124 may be configured to store data backups for the client system 102, which may be restored in the event of a loss of data.

The storage system 108 may be a file storage system or an object storage system that includes a file system 130 for file storage or an object storage system for object storage 132. Each storage system of the cluster of storage systems 108-112 may store backup data and/or metadata for the backup data within one or more computer nodes, and any combination of these computer nodes may be various types of computer nodes for a data center.

The operating environment 100 also includes an external key manager 134, a version control system 136, and a dynamic security monitor 138. The external key manager 134 can provide encryption keys that a backup storage system can use to encrypt data at rest. Since a system user may rotate encryption keys periodically for security reasons, a backup storage system may provide the options to automatically rotate encryption keys periodically by setting up encryption key rotation policies. The version control system 136 maintains and distributes copies of versions of applications, such as various software releases of the Data Domain operating system, and patches which correct any security vulnerabilities discovered between the versions of the software releases. For example, the version control system 136 may distribute the Data Domain operating system version 7.12, distribute a patch 7.12.1 for version 7.12, and then distribute a second patch 7.12.2 for version 7.12 before subsequently distributing the Data Domain operating system version 7.13.

The dynamic security monitor 138 can include data mining tools such as a Data Domain analyzer that performs analysis on auto-support bundles which the backup storage system provides as raw values for all the security parameters, The dynamic security monitor 138 can apply Artificial Intelligence/Machine-Learning, such as a LSTM [Long Short-Term Memory] network, to mine historic data, such as a time series, to detect patterns and make predictions which risk factors may become potential threats for security in the coming future, and therefore change the algorithm for determining the security health score to incorporate a newly discovered risk factor in the updated calculations of a revised security health score. In an example, if the dynamic security monitor 138 detects a pattern of security attacks being more frequent in the month of December in 2021 and 2022, then there is a possibility of poor security health score in December 2023. Such predictions can help alert a system user beforehand. The dynamic security monitor 138 can also generate dynamic security health scores for a backup storage system, as described below in reference to FIG. 2.

Figure 2:
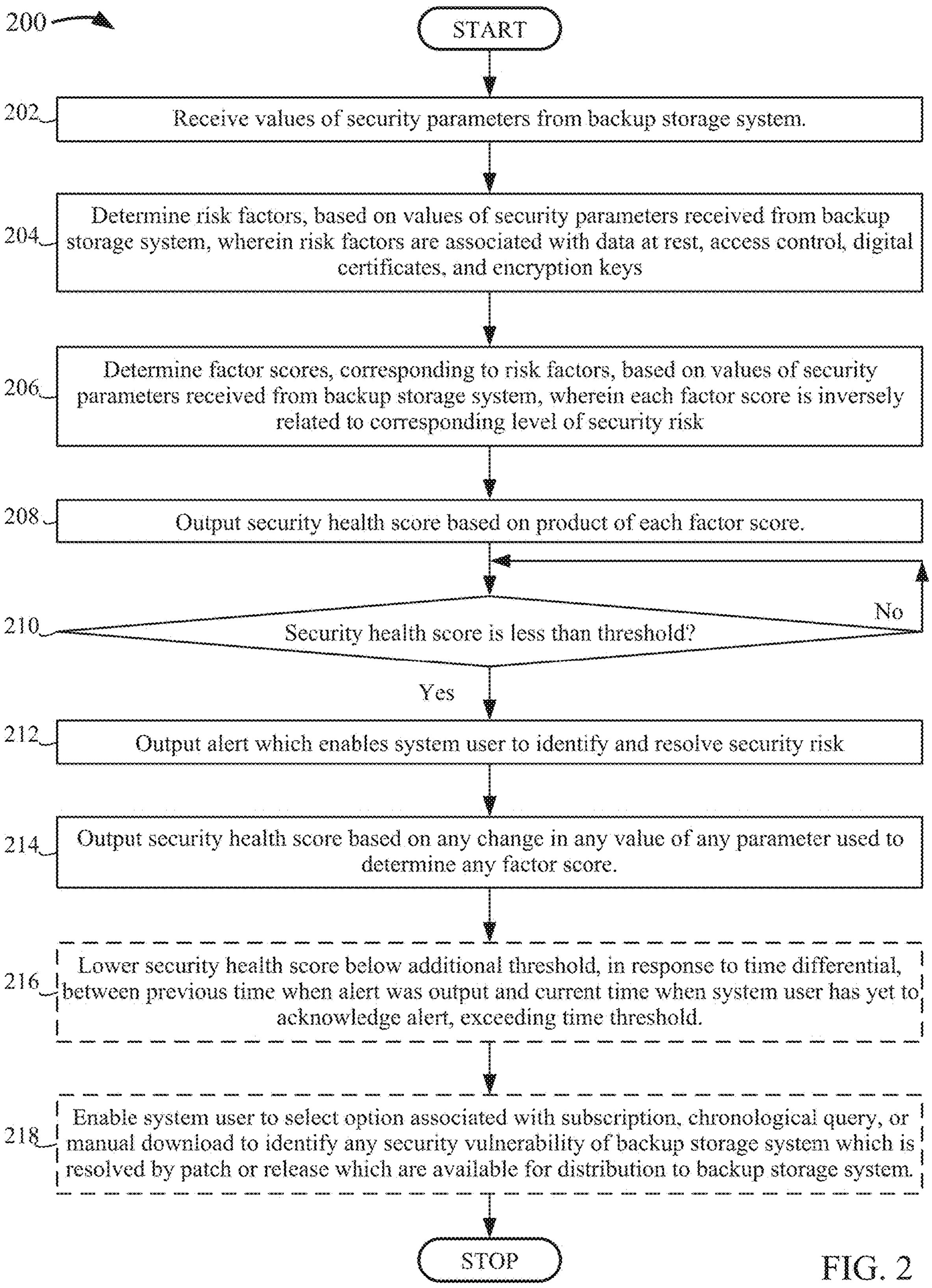
FIG. 2 is a flowchart that illustrates an example method for a dynamic security monitor for a backup storage system, under an embodiment.

FIG. 2 is a flowchart 200 that illustrates a method for a dynamic security monitor for a backup storage system, in an embodiment. Flowchart 200 depicts method acts illustrated as flowchart blocks for certain steps involving the client 102, the backup storage system, and the dynamic security monitor 138 of FIG. 1.

Values of security parameters are received from a backup storage system, block 202. The system receives security information from a backup storage system. For example, and without limitation, this can include the dynamic security monitor 138 receiving and analyzing the auto-support security parameters that a system user opted to provide from the backup storage system used by the system user.

A value can be a numerical amount or a meaning of an object, quantity, or expression. A security parameter can be a numerical or other measurable element forming one of a set that defines a system or sets the conditions of its operation to be free from danger or threat. A backup storage system can be an electronic device that retains a copy of computer information.

After receiving values of security parameters from a backup storage system, risk factors, which are based on the values of the security parameters received from the backup storage system, are determined, wherein the risk factors are associated with data at rest, access control, digital certificates, and encryption keys, block 204. The system identifies the risk factors in the security information from the backup storage system. By way of example and without limitation, this can include the dynamic security monitor 138 identifying risk factors which are associated with a data at rest encryption status, a security officer configuration, a digital certificate revocation status, an encryption key rotation frequency, a connectivity with an external data manager, an alert mechanism status, and a passphrase level.

A risk factor can be an influence that involves system exposure to danger and that contributes to a result or outcome. Data at rest can be computer information stored on an electronic device. Access control can be the power to influence or direct the action or process of obtaining or retrieving information stored in a computer's memory. A digital certificate can be a an electronic document or file that proves the authenticity of an encryption key. An encryption key can be a variable value that is applied using an algorithm to a string or block of uncoded text to produce coded text.

Risk factors associated with data at rest can include an encryption key rotation frequency and whether encryption is enabled for data at rest. In a backup storage system, a system user can set a weekly or monthly encryption key rotation policy and the expectation is that any one of several supported key managers such as the external key manager 134 will rotate encryption keys at that frequency. If encryption is not enabled on a backup storage system, then data at rest is not encrypted. An encryption key rotation frequency can be a rate for exchanging a variable value that is applied using an algorithm to a string or block of uncoded text to produce coded text. Encryption can be a process of converting information or data into a code, especially to prevent unauthorized access. Enabled can be adapted for use with a specified application or system.

Risk factors associated with access control can include whether a security officer is configured and a level of privileges which are configured for the security officer. Sometimes the security officer is not configured on a backup storage system. If a security office is configured on a backup storage system, the setting of various levels of privileges for the security officer may be one of the risk factors in the backup storage system.

A security officer can be a person holding a position of command or authority with a goal to make something free from danger or threat. Configured can be an arrangement of a computer system or element so as to be fit for a designated task. A level can be a position on a real or imaginary scale of amount, quantity, extent, or quality. A privilege can be a special right or advantage granted or available only to particular people and/or groups.

Risk factors associated with digital certificate can include a digital certificate expiration frequency and whether a digital certificate has been revoked. A digital certificate expiration frequency may be a risk factor for a backup storage system because electronic passwords may be invalidated too soon or too late for the security of the backup storage system. Additionally, sometimes digital certificates can get revoked on a backup storage system, and self-signed certificate versus external signed certificate may be considered as a part of this risk factor. A digital certificate expiration frequency can be a rate of invalidating a file or electronic element that proves the authenticity of a device, server, or user through the use of cryptography. Revoke can be to put an end to the validity or operation of something.

Risk factors can be associated with whether an alert mechanism is enabled, and a security level of a system passphrase. If an alert mechanism is enabled, alerts may be raised in case of security compromised events, which therefore can prompt a system user to improve the security of a backup storage system. A strong passphrase will help improve the security of a backup storage system, while a weak passphrase may be reported as a risk factor that weakens the overall security of the backup storage system.

An alert mechanism can be a system of components working together in an electronic device for an announcement or signal warning of danger. A security level can be a position on a real or imaginary scale of amount, quantity, extent, or quality of a goal to be free from danger or threat. A system passphrase can be a string of characters and/or symbols that must be used to gain access to a computer system or service.

Risk factors can also be associated with whether cloud provider encryption is enabled, and an authentication level for digital certificates. If cloud provider encryption is enabled, but encryption is not enabled for data at rest on a backup storage system, this encryption may be recorded and thus is not included in the evaluation of risk factors for a backup storage system. In a backup storage system that has replication setup, two-way certificate authentication can have a beneficial impact on the overall security of the backup storage system, one-way certificate authentication can have a somewhat neutral impact on the overall security of the backup storage system, and encryption that is not enabled can have a negative impact on the overall security of the backup storage system. Cloud provider encryption can be on-demand availability of computer system resources for the process of converting information or data into a code, especially to prevent unauthorized access. An authentication level can be a position on a real or imaginary scale of amount, quantity, extent, or quality for having a submitted identity verified.

A risk factor may be based on a time differential between a previous time when a patch or a software release became available for the backup storage system and a current time when the patch or the software release has yet to be installed on the backup storage system. For example, the longer that a system user ignores an alert about a patch that resolves an issue with system passwords, the lower the dynamic security monitor 138 will reduce the security health score, which triggers successive alerts about the security vulnerability resolved by the patch.

A time differential can be a distinction in amounts of things as measured in hours and minutes past midnight or noon. A previous time can be the past, which was existing or previously occurring, as measured in hours and minutes past midnight or noon. A patch can be a small piece of code that may be inserted into a program to improve its functioning or to correct an error. A software release can be a distribution of a computer application in an application distribution life cycle. Available can be the ability to be used or obtained. A current time can be the present as measured in hours and minutes past midnight or noon. An installation can be the act of establishing an electronic device in a condition that is ready for future use.

Similarly, a risk factor may be based on a time differential between a previous time when a new version of a backup storage system's operating system became available and a current time when the new version of the backup storage system's operating system has yet to be installed on a specific system. For example, the longer that a system user ignores an alert about security risks that could be resolved by purchasing and then installing the new version of the backup storage system's operating system, the lower the dynamic security monitor 138 will reduce the value used for generating the score that triggers the alert about the risk factor resolved by the new version of the backup storage system's operating system.

An external key manager 134 that periodically provides encryption keys to a backup storage system should be online continuously to ensure that periodic encryption key rotation takes place reliably. In case this frequency is less often than monthly, a large amount of data may be encrypted with a single encryption key, and failure to rotate keys in the expected time window can occur because of the various issues. Therefore, risk factors may be associated with these encryption key issues, such as whether the external key manager 134 has an issue with a connectivity to a backup storage system, an issue with digital certificates, an issue with an encryption key class, an issue with a transport security layer parameter, an issue with a non-existent encryption key, and/or an issue with an external key manager user. An external key manager can be an electronic device responsible for controlling or administering a variable value that is applied using an algorithm to a string or block of uncoded text to produce coded text. An issue can be an important problem.

Connectivity issues are a common problem when an external key manager's server is offline, and a backup storage system has issues with reaching this server. These connectivity issues can occur because of an incorrect port, a transport security layer version mismatch if the external key manager's server does not use the same version of transport security layer that the backup storage system uses, or if within the transport security layer the cipher that the backup storage system uses is disallowed. There can even be a connectivity issue with the network cable. Connectivity can be a capacity for the linking of platforms, systems, and applications.

Certificate validation is another issue if a system user set an external key manager's digital certificates valid for 1 year and the connection with the external key manager's server breaks. The dynamic security monitor 138 can detect this problem and output an alert to the system user, which identifies the issue on the validity of the digital certificates, untrusted certificates, or revocation of digital certificates on the backup storage system. Traditionally, a backup storage system detected the root cause of this issue only when a system user raised this issue.

An encryption key class may be used as an identifier by the external key manager 134 to identify a backup storage system's encryption keys. An incorrectly set up encryption key class will not fetch an encryption key, even if the encryption key exists on the external key manager 134. An encryption key class can be a set or category of a variable value that is applied using an algorithm to a string or block of uncoded text to produce coded text.

Transport security layer parameters on the external key manager 134 may be reconfigured. For example, if an Elliptic-curve Diffie-Hellman protocol cipher which was present for a transport security layer is shutdown, then even though nothing has changed on the backup storage system's side, this shutdown can still be a source of failure. A transport security layer parameter can be a numerical or other measurable factor forming a cryptographic protocol designed to provide communications free from danger and threats over a computer network. An encryption key that is present on a backup storage system might be missing, or non-existent from the external key manager 134. A non-existent encryption key can be a variable value that was applied using an algorithm to a string or block of uncoded text to produce coded text, and that is currently missing.

An external key manager assigns each encryption key to an owner who is a specific system user. An external key manager user must use their assigned encryption key while interacting with the external key manager 134. An incorrectly configured external key manager user will result in the failure of an encryption key rotation. An external key manager user can be a person responsible for controlling or administering a variable value that is applied using an algorithm to a string or block of uncoded text to produce coded text.

Following the identification of risk factors, factor scores, corresponding to the risk factors, are determined based on values of the security parameters received from the backup storage system, wherein each factor score is inversely related to a corresponding level of security risk, block 206. The system generates factor scores for the individually identified risk factors. In embodiments, this can include the dynamic security monitor 138 assigning the highest factor score of 10 to each of the risk factors which indicate that data at rest is encrypted, a security officer is configured with an appropriate level of privileges, no digital certificates are revoked, encryption keys are rotated weekly, a good connectivity with an external key manager, and a system for alerting users is enabled. However, the dynamic security monitor 138 assigns a medium-to-high-factor score of 7.5 to the risk factor for passphrases because the system user is not using sufficiently strong passphrases.

A factor score can be a number that expresses excellence by comparison to a standard influence that contributes to a result or outcome. An inverse relationship can be one in which the value of one parameter tends to decrease as the value of the other parameter increases. A security risk can be an exposure of a system to danger and threats.

The dynamic security monitor 138 assigns each risk factor a factor score that is based on a perceived risk, such as the scores ranging from the lowest factor score of 1 for a high risk, to a factor score of 5 for a medium risk, to the highest factor score of 10 for a low risk. For options which are more binary, such as whether or not a security officer authorization is enabled, the status of enabled may be assigned the highest factor score of 10 and the status of disabled may be assigned the lowest factor score of 1.

Having determined each individual factor score, a security health score is determined based on a product of each factor score, block 208. The system combines the individual factor scores into a security health score for the backup storage system. For example, and without limitation, this can include the dynamic security monitor 138 combining all of the factors scores to generate a security health score of 75 for the system user's backup storage system. A security health score can be a number that expresses excellence by comparison to a standard for a system avoiding exposure to danger and threats. A product can be the number or expression resulting from the multiplication together of two or more numbers or expressions.

The overall security health score may be determined using a product of all the factor scores with their associated weights, which the dynamic security monitor 138 provides for each factor score. Based on an analysis of historical uses of factor scores that produced security health scores and subsequent security risks identified relative to each of the factor scores, determining the security health score can include determining a corresponding weight for weighing each of the factor scores. For example, some factor scores such as the factor scores for stronger non-repeating account passwords or a security officer enablement carry a heavier weight when determining the overall security health score, while other factor scores such as for the choice of an external key manager carry a lower weight when determining the overall security health score. Weights assigned to the factor scores can also change dynamically based on the features that the version control system 136 is providing to a system user in a particular software release. For example, if the version control system 136 has provided a very strong passphrase mandate for a particular software release, then the dynamic security monitor can lower the weight for the passphrase because the passphrase will have to be very strong to be accepted by the very strong passphrase mandate.

A weight can be a numerical coefficient assigned to an item to express its relative importance. An analysis can be a detailed examination of anything complex in order to understand its nature or to determine its essential features. A historical use can be a previous manner of applying something. A subsequent security risk can be a future exposure of a system to danger and threats.

Determining the security health score can also include normalizing the security health score using a maximum security health score determined from a product of a maximum value for each factor score and any corresponding weights. Normalize can be to make something conform to or reduce something to a standard. A maximum value can be the greatest or highest amount possible for a numerical amount. For example, the dynamic security monitor 138 assigns the highest factor score of 10 to each of the (7) following risk factors which indicate that (1) data at rest is encrypted, (2) a security officer is configured, (3) the security officer has an appropriate level of privileges, (4) no digital certificates are revoked, (5) encryption keys are rotated weekly, (6) a good connectivity with an external key manager, and (7) a system for alerting users is enabled. The dynamic security monitor 138 assigns a medium-to-high factor score of 7.5 to the risk factor for passphrases because the system user is not using sufficiently strong passphrases. The factor score for stronger non-repeating account passwords is assigned a heavier weight of 4, the factor score for security officer enablement is assigned a heavier weight of 2, and the factor score for the choice of an external key manager is assigned a lower weight of 0.5, while all remaining factor scores are assigned a neutral weight of 1.0.

The weighted factor scores would be 10 [data at rest is encrypted risk factor]*10 [security officer is configured risk factor]*2 [enabling security officer weight]*10 [security officer has appropriate level of privileges risk factor]*10 [no digital certificates are revoked risk factor]*10 [encryption keys are rotated weekly risk factor]*10 [good connectivity with external key manager risk factor]*0.5 [choice of external key manager weight]*10 [system for alerting users is enabled risk factor]*7.5 [passphrases risk factor]*4 [passwords weight]. Therefore, the factor scores and their weights would be 10*10*2*10*10*10*10*0.5*10*7.5*4=300,000,000, with the maximum value of 400,000,000 if the factor score of 7.5 for passphrases was replaced by a maximum factor score of 10. The security health score is normalized by dividing 300,000,000 by the maximum value of 400,000,000 to generate a security health score of 75%, which may be expressed more simply as 75. The value of 100,000,000 which is missing from the maximum value is entirely due to the factor score of 7.5 assigned to the passphrase, which is reported with the security health score to the system user as a suggestion to resolve the issue. Since a security health score of less than 60 is classified as poor, a security health score between 60 and 80 is classified as fair, and a security health score that is greater than 80 is classified as good, the current security health score based on the issue with the passphrase is classified as fair.

Continuing this example, all the other factor scores and weights remain the same when the security officer modifies his own level of privileges to include an insecure access privilege of being a super user while working at home, and the dynamic security monitor 138 changes the factor score for the security officer's level of privileges from a 10.0 to a 6.0. This change of a single parameter resulted in multiplying the previous product by 0.6 (the current risk score of 6.0 for the security officer's level of privileges divided by the previous risk score of 10.0 for the security officer's level of privileges equals 0.6), which drastically reduces the security health score from 75% to 45%, or from 75 to 45. Since a security health score of less than 60 is classified as poor, a security health score between 60 and 80 is classified as fair, and a security health score that is greater than 80 is classified as good, the current security health score based on the issue with the passphrase and the issue with the security officer's level of privileges is classified as poor.

The weights assigned to each of these factor scores will enable the dynamic security monitor 138 to prioritize which risk factor is a higher priority for resolving issues. For example, the weight of the factor score of 7.5 for the risk factor for passphrases is a factor score that is 2.5 below a perfect factor score of 10.0, and corresponds to the weight of 4.0 for passwords. Therefore, the risk score deficiency of 2.5 is multiplied by the weight of 4.0, which produces a weighted deficiency of 2.5*4.0, which equals a deficit of 10.0 weighted points for passphrases/passwords. For the other example, the weight of the factor score of 6.0 for the risk factor for the security officer's level of privileges is a factor score that is 4.0 below a perfect factor score of 10.0, ad corresponds to the default weight of 1.0. Therefore, the risk score deficiency of 4.0 is multiplied by the weight of 1.0, which produces a weighted deficiency of 4.0*1.0, which equals a deficit of 4.0 weighted points for security officer level of privileges. Consequently, when the dynamic security monitor 138 outputs the updated score of 45, the recommendations for resolving the issues are based on the factor scores below 10 for the passphrases and the security officer's level of privileges, and the determination of each issue's deficit of weighted points identifies resolving the passphrase issue, which has a deficit of 10.0 weighted points, as the highest priority, followed by resolving the issue with the security officer's level of privileges, which has a deficit of 4.0 weighted points, and is therefore a lower priority.

The reason that the dynamic security monitor 138 uses multiplication of all the factor scores along with their associated weights is indicated in the example above. When the dynamic security monitor 138 is multiplying all these weighted factor scores, the insecure access privilege for the security officer is a very important risk factor that will drastically reduce the security health score. Therefore, even only one new factor score being a medium risk will in turn negatively impact the security health score drastically. This multiplicative score calculation model lowers the security health score even if one of the important risk factors has a factor score that is negatively impacted.

Figure 3A:
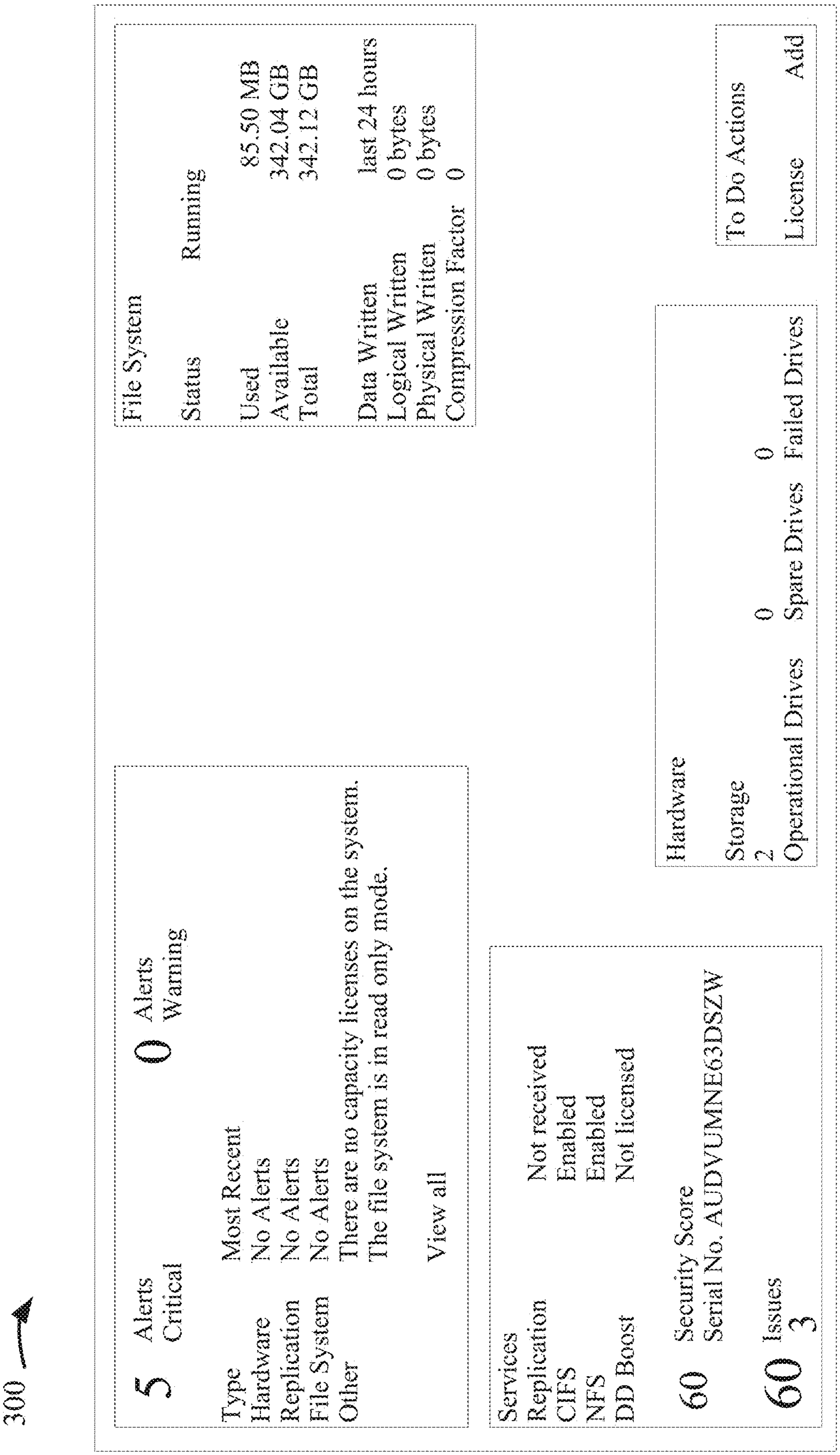
FIGS. 3A and 3B are block diagrams that illustrate example manager dashboards for a dynamic security monitor for a backup storage system, under an embodiment.
Figure 3B:
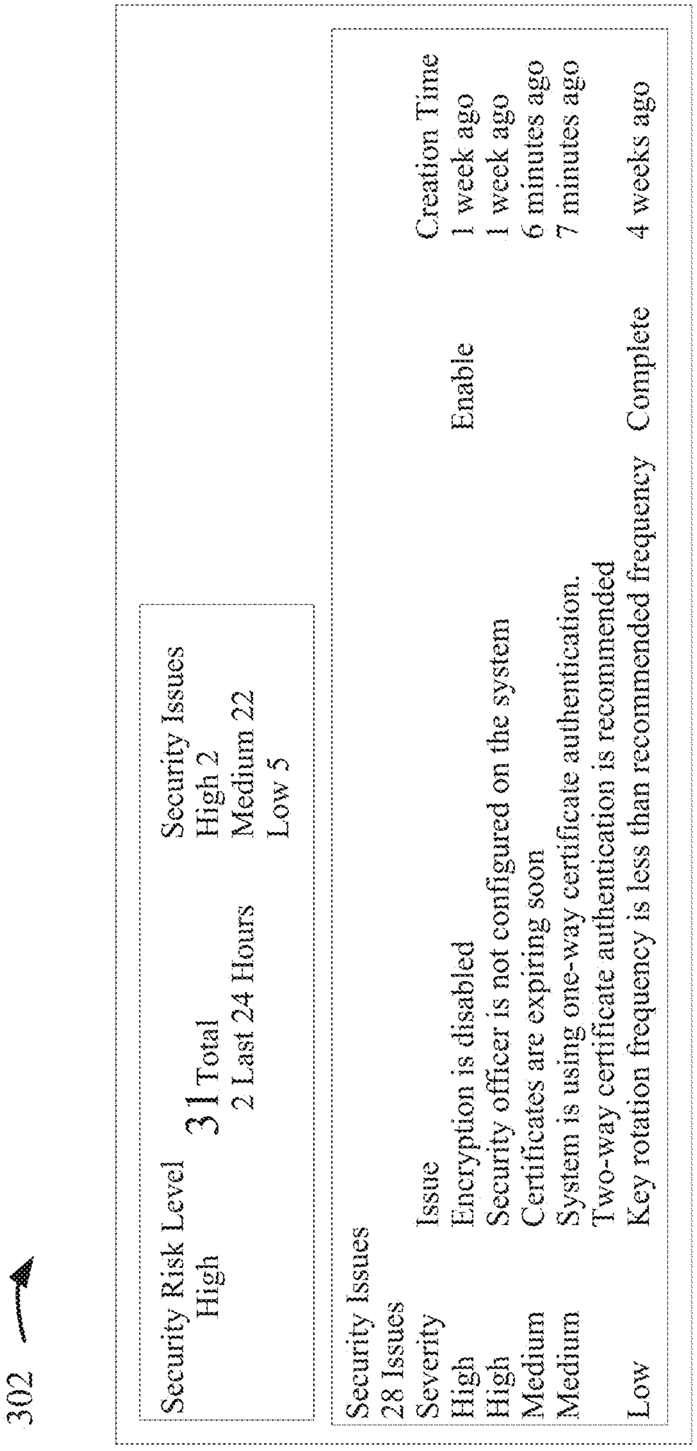

The security health score of the backup storage system may be included with the diagnosability data which was received from the backup storage system, and displayed on various management dashboards. FIGS. 3A and 3B are block diagrams that illustrate example manager dashboards 300 and 302 for a dynamic security monitor for a backup storage system, under an embodiment, in which manager dashboard 300 depicts a security health score of 60 and a list of 5 alerts that are critical, while manager dashboard 302 depicts a list of security risk factors that have risk scores which are high, medium, or low, and a list of security issues ranked by severity. Raw factor scores for all the risk factors based on security parameters help a system user to understand what security parameters have to be improved upon, and are currently contributing to a lack of security. The management dashboards can present a system user with an option to display the risk factors contributing to a less than perfect security health score.

After determining a security health score, a determination is made whether the security health score is less than a threshold, block 210. The system compares the current security health score to a standard for a healthy security score. By way of example and without limitation, this can include the dynamic security monitor 138 determining that the current security health score of 75 is less than the desired minimum security health score of 80. If the security health score is less than a threshold, the flowchart 200 proceeds to block 212 to output an alert. If the security health score is not less than a threshold, then the flowchart 200 remains at block 210 to monitor the security health score until the score is less than the threshold. A threshold can be the magnitude or intensity that a value must be less than (or greater than) for a certain reaction, phenomenon, result, or condition to occur or be manifested.

In response to determining that the security health score is less than a threshold, an alert is output to enable a system user to identify and resolve a security risk, block 212. The system alerts a system user about security risks identified by low security health scores. In embodiments, this can include the dynamic security monitor 138 alerting the system user of the need to strengthen the passphrases, as indicated by the security health score of 75. A system user can be a person who operates a computer. An alert can be an announcement or signal warning of danger.

After initially determining a security health score, the security health score is updated based on any change in any value of any parameter used to determine any factor score, block 214. The system dynamically updates the security health score based on any change in any value of any parameter used to determine any factor score. For example, and without limitation, this can include the dynamic security monitor 138 responding to the system user improving the strength of the passphrases by dynamically updating the security health score to 100, and then continuing to monitor all of the values of the system parameters received in the auto-support information provided by the backup storage system used by the system user. A change can be a modification.

A security health score is optionally lowered below an additional threshold, in response to a time differential, between a previous time when an alert was output and a current time when a system user has yet to acknowledge the alert, exceeding a time threshold, block 216. The system lowers a security health score if a system user does not respond to the alert triggered by the low security health score. By way of example and without limitation, this can include the dynamic security monitor 138 responding to the system user continuing to ignore the low security health score of 75 by periodically lowering the security health score over a period of time so that this low security health score is bought to the system user's attention. In case the system user does not act upon a lower security health score, the dynamic security monitor 138 will lower the security health score further over a period time to make the security gap more visible.

An additional threshold can be another magnitude or intensity that a value must be less than (or greater than) for a certain reaction, phenomenon, result, or condition to occur or be manifested. A time threshold can be a chronological value that a value must be less than (or greater than) for a certain reaction, phenomenon, result, or condition to occur or be manifested.

The dynamic security monitor 138 can provide three options for a system user to access the information in a file which identifies security vulnerabilities in the backup storage system used by the system user, but only vulnerabilities which have been resolved by a patch and/or an updated version of a software release, such as version 7.13 of the Data Domain operating system, which are available from the version control system 136. The dynamic security monitor 138 enables a system user to access this security vulnerabilities file, which may be structured <release version><security issue number><security vulnerability rank>, by selecting any one of the following options. The dynamic security monitor 138 can enable a system user to setup a subscription with the version control system 136, which will automatically push the file which lists the recently resolved security vulnerabilities to the client 102 of the system user whenever a patch or a version of a software release becomes available to be distributed. The dynamic security monitor 138 can also enable a system user to schedule a periodic query on the client 102, which at regular intervals will query the version control system 136 to list the recently resolved security vulnerabilities to the client 102 of the system user. The dynamic security monitor 138 can additionally enable a system user to manually download the file that lists the recently resolved security vulnerabilities to the client 102 of the system user, by providing the instructions for manually downloading from the version control system 136.

Therefore, the dynamic security monitor 138 can enable a system user to select from options for one of a subscription, a periodic query, or a manual download which identifies security vulnerabilities of the backup storage system which are resolved by a patch and/or a software release which are available for distribution to the backup storage system, block 218. The system enables a system user to select how to receive descriptions of the current security vulnerabilities for the system user's backup storage system which are resolved by patches and/or software releases that are available for the backup storage system. In embodiments, this can include the dynamic security monitor 138 enabling a system user to subscribe to a list of the backup storage system's recently resolved security vulnerabilities, which is provided by the version control system 136.

A subscription can be the action of agreeing to occasionally receive something. A periodic query can be a regularly recurring request for specific data from a computer. A manual download can be a human causing the copying of data from one computer system to another, typically over the internet. A security vulnerability can be a condition of being exposed to danger or a threat.

Continuing the example, the dynamic security monitor 138 considers that the system user's Data Domain operating system is on software release version 7.12 and the security health score is currently 80. In the future, when a patch 7.12.1 is available for software release version 7.12, then the dynamic security monitor 138 reduces the security health score from 80 to 78 even though the system user has not changed any setup. The reason for the score reduction is the patch version 7.12.1 has resolved security vulnerabilities present in the Data Domain operating system version 7.12, but the system user has not yet taken advantage of the opportunity to improve the security of the system user's Data Domain operating system version 7.12.

The dynamic security monitor 138 can help by resolving some issues, such as by proactively aggregating the external key-manager's health monitoring service statistics. If the digital certificates are going to expire in a few months, then the dynamic security monitor 138 can update a system user before the expiry takes place. The dynamic security monitor 138 can ensure that encryption key rotation is successful, thus helping with improved security of the backup storage system. Another use case is when the digital certificates have already expired, then the dynamic security monitor 138 can report this issue to a system user and suggest upgrading to new digital certificates.

The dynamic security monitor 138 can detect if a digital certificate is revoked. In case of connectivity issues, the dynamic security monitor 138 can periodically evaluate the connectivity to the external key manager's server and then report the connectivity issues to a system user before the system user needs to connect their backup storage system. The dynamic security monitor 138 can detect if a valid read-write key is present with the associated key class. The dynamic security monitor 138 can also detect if the transport security layer parameters are reconfigured on a backup storage's server side and if they are the cause of an encryption key rotation failure, and then report this information to a system user.

The dynamic security monitor 138 can alert a system user beforehand about the security vulnerabilities. The dynamic security monitor 138 can schedule a periodic run to determine the above issues for a backup storage system. A major advantage of this scheduling is that the dynamic security monitor 138 can report the problem and solution to a system user even before any problem occurs.

Although FIG. 2 depicts the blocks 202-218 occurring in a specific order, the blocks 202-218 may occur in another order. In other implementations, each of the blocks 202-218 may also be executed in combination with other blocks and/or some blocks may be divided into a different group of blocks.

Figure 4:
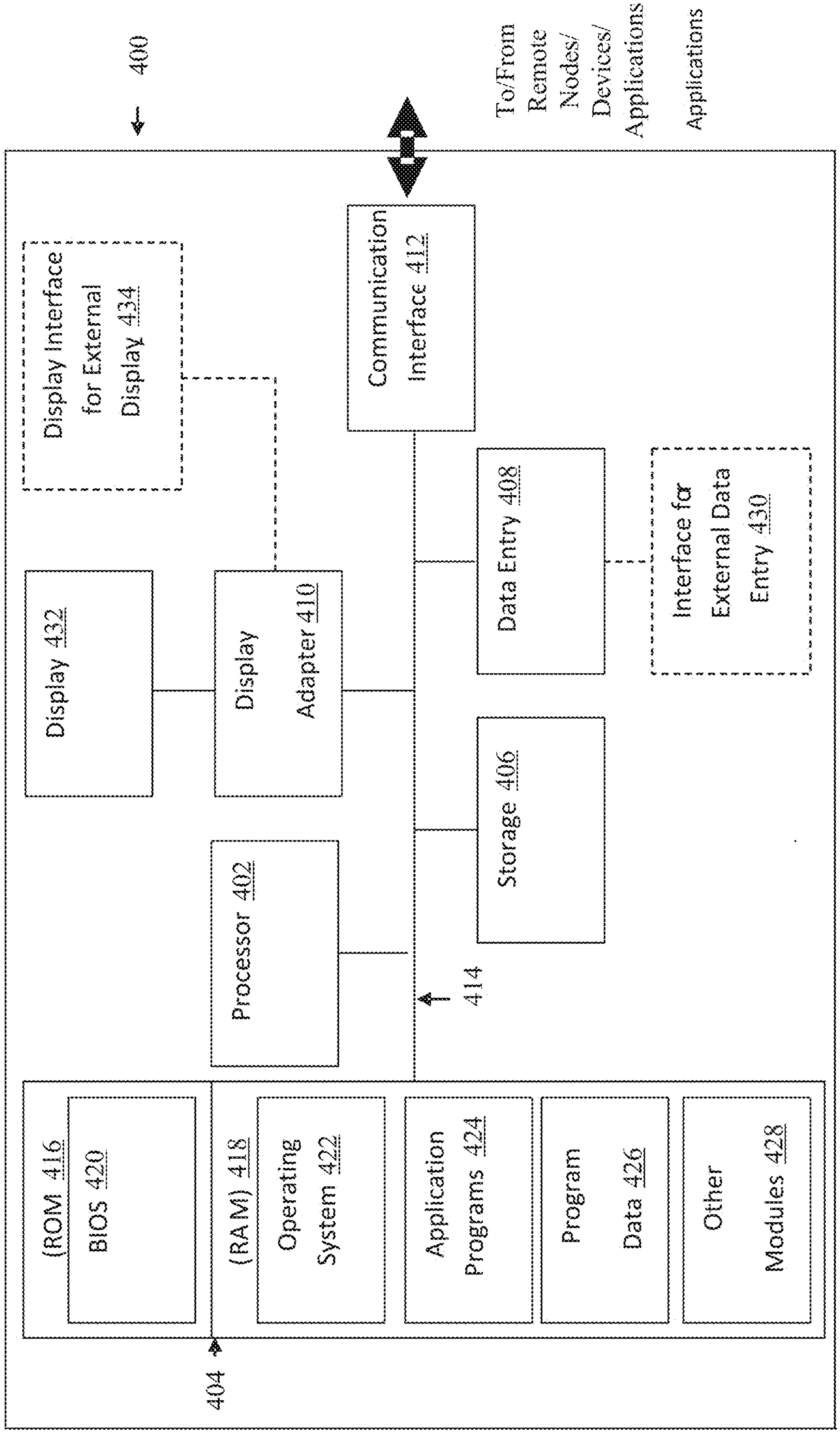
FIG. 4 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4 an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random-access memory (RAM) 418. The memory 404 may be configured to store program instructions and data during operation of the hardware device 400. In various embodiments, the memory 404 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 400. It is noted that the methods described herein may be embodied in executable instructions stored in a computer readable medium for use by or in connection with an instruction execution machine, apparatus, or device, such as a computer-based or processor-containing machine, apparatus, or device.

It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for conducting the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430.

By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device, or other common network node, and typically includes many or all the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated if other hardware and/or software to establish communications between the hardware device 400 and other devices may be used.

The arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it.

The computer, which reconfigures or otherwise alters the operation of the device in a manner well understood by those skilled in the art. The data structures where data is maintained are physical locations of the memory that have properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for a dynamic security monitor for a backup storage system, comprising:

one or more processors; and a non-transitory computer readable medium storing a plurality of instructions, which when executed, cause the one or more processors to:

determine a plurality of risk factors, which are based on security parameters received from a backup storage system, wherein the plurality of risk factors are associated with data at rest, access control, digital certificates, and encryption keys;

determine a plurality of factor scores, corresponding to the plurality of risk factors, which are based on values of the security parameters received from the backup storage system, wherein each factor score is inversely related to a corresponding level of security risk;

output a security health score based on a product of each of the plurality of factor scores;

output an alert that enables a system user to identify and resolve a security risk, in response to a determination that the security health score is less than a threshold;

cause options for resolving the security risk to be displayed as selectable on a graphical user interface, the options comprising at least one of: i) alerting a system user of the need to strengthen the user's passphrase, ii) notifying a system user that the user's digital certificate has expired, is about to expire or has been revoked, iii) rotating an encryption key in accordance with an encryption key rotation policy, iv) distributing a software release that corrects a vulnerability discovered between versions of the software release, v) subscribing to a subscription with a version control system that automatically pushes a file that lists security vulnerabilities that have recently been resolved by a software patch and/or updated version of a software release, vi) querying at regular intervals the version control system for the file, or vii) providing instructions for manually downloading the file from the version control system;

cause, in response to a selection of one of the displayed options, configuring the backup storage system to resolve the security risk in accordance with the selected option; and output an updated security health score based on any change in any value of any parameter used to determine any of the plurality of factor scores.

2. The system of claim 1, wherein risk factors associated with data at rest comprise an encryption key rotation frequency and whether encryption is enabled for data at rest, risk factors associated with access control comprise whether a security officer is configured and a level of privileges which are configured for the security officer, and risk factors associated with digital certificates comprise a digital certificate expiration frequency and whether a digital certificate has been revoked.

3. The system of claim 1, wherein risk factors associated with encryption keys comprise whether an external key manager has an issue with at least one of a connectivity, digital certificates, an encryption key class, a transport security layer parameter, a non-existent encryption key, or an external key manager user.

4. The system of claim 1, wherein the plurality of risk factors further comprise at least one of whether an alert mechanism is enabled, a security level of a system passphrase, whether cloud provider encryption is enabled, an authentication level for digital certificates, or a factor based on a time differential between a previous time when one of a patch or a software release became available and a current time when the patch or the software release has yet to be installed for the backup storage system.

5. The system of claim 1, wherein determining the security health score comprises weighing each of the plurality of factor scores by a corresponding weight which is determined based on an analysis of historical uses of factor scores to produce security health scores and subsequent security risks identified relative to each of the factor scores, and comprises normalizing the security health score using a security health score determined from a product of a maximum value for each factor score and any corresponding weights.

6. The system of claim 1, wherein the plurality of instructions further causes the processor to lower the security health score below an additional threshold, in response to a time differential, between a previous time when the alert was output and a current time when the system user has yet to acknowledge the alert, exceeding a time threshold.

7. The system of claim 1, wherein the plurality of instructions further causes the processor to enable the system user to select an option associated with one of a subscription, a periodic query, or a manual download to identify any security vulnerability of the backup storage system which is resolved by at least one of a patch or a software release which is available for distribution to the backup storage system.

8. A computer-implemented method for a dynamic security monitor for a backup storage system, the computer-implemented method comprising:

determining a plurality of risk factors, which are based on security parameters received from a backup storage system, wherein the plurality of risk factors are associated with data at rest, access control, digital certificates, and encryption keys;

determining a plurality of factor scores, corresponding to the plurality of risk factors, which are based on values of the security parameters received from the backup storage system, wherein each factor score is inversely related to a corresponding level of security risk;

outputting a security health score based on a product of each of the plurality of factor scores;

outputting an alert that enables a system user to identify and resolve a security risk, in response to a determination that the security health score is less than a threshold;

causing options for resolving the security risk to be displayed as selectable on a graphical user interface, the options comprising at least one of: i) alerting a system user of the need to strengthen the user's passphrase, ii) notifying a system user that the user's digital certificate has expired, is about to expire or has been revoked, iii) rotating an encryption key in accordance with an encryption key rotation policy, iv) distributing a software release that corrects a vulnerability discovered between versions of the software release, v) subscribing to a subscription with a version control system that automatically pushes a file that lists security vulnerabilities that have recently been resolved by a software patch and/or updated version of a software release, vi) querying at regular intervals the version control system for the file, or vii) providing instructions for manually downloading the file from the version control system;

causing, in response to a selection of one of the displayed options, configuring the backup storage system to resolve the security risk in accordance with the selected option; and outputting an updated security health score based on any change in any value of any parameter used to determine any of the plurality of factor scores.

9. The computer-implemented method of claim 8, wherein risk factors associated with data at rest comprise an encryption key rotation frequency and whether encryption is enabled for data at rest, risk factors associated with access control comprise whether a security officer is configured and a level of privileges which are configured for the security officer, and risk factors associated with digital certificates comprise a digital certificate expiration frequency and whether a digital certificate has been revoked.

10. The computer-implemented method of claim 8, wherein the encryption key factors comprise whether an external key manager has an issue with at least one of a connectivity, digital certificates, an encryption key class, a transport security layer parameter, a non-existent encryption key, or an external key manager user.

11. The computer-implemented method of claim 8, wherein the plurality of risk factors further comprise at least one of whether an alert mechanism is enabled, a security level of a system passphrase, whether cloud provider encryption is enabled, an authentication level for digital certificates, or a factor based on a time differential between a previous time when one of a patch or a software release became available for the backup storage system and a current time when the patch or the software release has yet to be installed for the backup storage system.

12. The computer-implemented method of claim 8, wherein determining the security health score comprises weighing each of the plurality of factor scores by a corresponding weight which is determined based on an analysis of historical uses of factor scores to produce security health scores and subsequent security risks identified relative to each of the factor scores, and comprises normalizing the security health score using a security health score determined from a product of a maximum value for each factor score and any corresponding weights.

13. The computer-implemented method of claim 8, wherein the computer-implemented method further comprises lowering the security health score below an additional threshold, in response to a time differential, between a previous time when the alert was output and a current time when the system user has yet to acknowledge the alert, exceeding a time threshold.

14. The computer-implemented method of claim 8, wherein the computer-implemented method further comprises enabling the system user to select an option associated with one of a subscription, a periodic query, or a manual download to identify any security vulnerability of the backup storage system which is resolved by at least one of a patch or a software release which is available for distribution to the backup storage system.

15. A computer program product, comprising a non-transitory computer-readable medium having a computer-readable program code embodied therein to be executed by one or more processors, the program code including instructions to:

determine a plurality of risk factors, which are based on security parameters received from a backup storage system, wherein the plurality of risk factors are associated with data at rest, access control, digital certificates, and encryption keys;

determine a plurality of factor scores, corresponding to the plurality of risk factors, which are based on values of the security parameters received from the backup storage system, wherein each factor score is inversely related to a corresponding level of security risk;

output a security health score based on a product of each of the plurality of factor scores;

output an alert that enables a system user to identify and resolve a security risk, in response to a determination that the security health score is less than a threshold;

cause options for resolving the security risk to be displayed as selectable on a graphical user interface, the options comprising at least one of: i) alerting a system user of the need to strengthen the user's passphrase, ii) notifying a system user that the user's digital certificate has expired, is about to expire or has been revoked, iii) rotating an encryption key in accordance with an encryption key rotation policy, iv) distributing a software release that corrects a vulnerability discovered between versions of the software release, v) subscribing to a subscription with a version control system that automatically pushes a file that lists security vulnerabilities that have recently been resolved by a software patch and/or updated version of a software release, vi) querying at regular intervals the version control system for the file, or vii) providing instructions for manually downloading the file from the version control system;

cause, in response to a selection of one of the displayed options, configuring the backup storage system to resolve the security risk in accordance with the selected option; and output an updated security health score based on any change in any value of any parameter used to determine any of the plurality of factor scores.

16. The computer program product of claim 15, wherein risk factors associated with data at rest comprise an encryption key rotation frequency and whether encryption is enabled for data at rest, risk factors associated with access control comprise whether a security officer is configured and a level of privileges which are configured for the security officer, and risk factors associated with digital certificates comprise a digital certificate expiration frequency and whether a digital certificate has been revoked.

17. The computer program product of claim 15, wherein determining the security health score comprises weighing each of the plurality of factor scores by a corresponding weight which is determined based on an analysis of historical uses of factor scores to produce security health scores and subsequent security risks identified relative to each of the factor scores, and comprises normalizing the security health score using a security health score determined from a product of a maximum value for each factor score and any corresponding weights.

18. The computer program product of claim 15, wherein risk factors associated with encryption keys comprise whether an external key manager has an issue with at least one of a connectivity to the backup storage system, digital certificates, an encryption key class, a transport security layer parameter, a non-existent encryption key, or an external key manager user, and wherein the plurality of risk factors further comprise at least one of whether an alert mechanism is enabled, a security level of a system passphrase, whether cloud provider encryption is enabled, an authentication level for digital certificates, or a factor based on a time differential between a previous time when one of a patch or a software release became available for the backup storage system and a current time when the patch or the software release has yet to be installed for the backup storage system.

19. The computer program product of claim 15, wherein the program code includes further instructions to lower the security health score below an additional threshold, in response to a time differential, between a previous time when the alert was output and a current time when the system user has yet to acknowledge the alert, exceeding a time threshold.

20. The computer program product of claim 15, wherein the program code includes further instructions to enable the system user to select an option associated with one of a subscription, a periodic query, or a manual download to identify any security vulnerability of the backup storage system which is resolved by at least one of a patch or a software release which is available for distribution to the backup storage system.

* * * * *